United States Patent
Johnson et al.

(10) Patent No.: US 10,029,416 B2
(45) Date of Patent: Jul. 24, 2018

(54) POLYMER SPRAY DEPOSITION METHODS AND SYSTEMS

(71) Applicant: Palo Alto Research Center Incorporated, Palo Alto, CA (US)

(72) Inventors: David Mathew Johnson, San Francisco, CA (US); Armin R. Volkel, Mountain View, CA (US); Victor Beck, Menlo Park, CA (US); John Steven Paschkewitz, Fremont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 823 days.

(21) Appl. No.: 14/166,834

(22) Filed: Jan. 28, 2014

(65) Prior Publication Data

US 2015/0210009 A1    Jul. 30, 2015

(51) Int. Cl.
*B29C 67/00* (2017.01)
*B05B 17/04* (2006.01)
*B29C 64/112* (2017.01)
*B29C 64/20* (2017.01)
*B29K 105/00* (2006.01)
(Continued)

(52) U.S. Cl.
CPC .......... *B29C 67/0059* (2013.01); *B05B 17/04* (2013.01); *B29C 64/112* (2017.08); *B29C 64/20* (2017.08); *B29K 2101/12* (2013.01); *B29K 2105/0058* (2013.01); *B33Y 10/00* (2014.12); *B33Y 30/00* (2014.12)

(58) Field of Classification Search
USPC ........................ 427/421.1; 118/300, 407, 419
See application file for complete search history.

(56) References Cited

U.S. PATENT DOCUMENTS

| | | | |
|---|---|---|---|
| 2,291,046 | A | 7/1942 | Lange |
| 3,554,815 | A | 1/1971 | Otto |

(Continued)

FOREIGN PATENT DOCUMENTS

EP    2227834    8/2011

OTHER PUBLICATIONS

Non-Final Office Action for U.S. Appl. No. 14/066,435, dated Jan. 21, 2016, 29 pages.

(Continued)

*Primary Examiner* — Jacob T Minskey
(74) *Attorney, Agent, or Firm* — Marger Johnson

(57) ABSTRACT

Polymer spray deposition systems and methods are disclosed that can be used with a wide range of thermoplastic materials to produce high resolution objects having the complexity and structural integrity typically only achieved using more traditional manufacturing techniques, like injection molding processes. The polymeric spray deposition systems and methods use a spray generator that stretches the fluid between two diverging surfaces, such as two rollers or between two pistons. The stretched fluid breaks apart into a plurality of droplets and is guided through a delivery system, that can include an optional droplet size selector, and into a multi-nozzle array. The multi-nozzle array is controlled and directs the spray onto a target surface, thereby creating a three-dimensional object. The disclosed polymer spray deposition systems and methods can be used in three-dimensional print heads and printing techniques.

14 Claims, 14 Drawing Sheets

(51) Int. Cl.
  *B29K 101/12* (2006.01)
  *B33Y 10/00* (2015.01)
  *B33Y 30/00* (2015.01)

(56) References Cited

U.S. PATENT DOCUMENTS

| | | | |
|---|---|---|---|
| 3,626,833 | A | 12/1971 | Koch |
| 3,649,829 | A | 3/1972 | Randolph |
| 3,702,258 | A | 11/1972 | Gibbons et al. |
| 3,717,875 | A | 2/1973 | Arciprete et al. |
| 3,873,025 | A | 3/1975 | Qvarnstrom |
| 3,926,114 | A | 12/1975 | Matuschke |
| 4,034,670 | A * | 7/1977 | Zavodny .......... B41F 7/30 101/148 |
| 4,222,059 | A | 9/1980 | Crean et al. |
| 4,384,296 | A | 5/1983 | Torpey |
| 5,270,086 | A | 12/1993 | Hamlin |
| 5,314,119 | A | 5/1994 | Watt |
| 6,382,524 | B1 | 5/2002 | James |
| 6,576,861 | B2 | 6/2003 | Sampath et al. |
| 6,622,335 | B1 | 9/2003 | Anderson et al. |
| 6,934,142 | B2 | 8/2005 | Grosse et al. |
| 7,083,830 | B2 | 8/2006 | Minko |
| 8,132,744 | B2 | 3/2012 | King et al. |
| 8,272,579 | B2 * | 9/2012 | King .......... B01L 3/0268 239/227 |
| 8,511,251 | B2 | 8/2013 | Sato |
| 8,552,299 | B2 | 10/2013 | Rogers et al. |
| 8,720,370 | B2 | 5/2014 | Rebstock |
| 8,742,246 | B2 | 6/2014 | Toyoda et al. |
| 9,021,948 | B2 | 5/2015 | Pattekar |
| 2002/0053320 | A1 | 5/2002 | Duthaler et al. |
| 2005/0000231 | A1 | 1/2005 | Lee |
| 2006/0035033 | A1 | 2/2006 | Tanahashi et al. |
| 2009/0014046 | A1 | 1/2009 | Yu et al. |
| 2010/0154856 | A1 | 6/2010 | Yuichi et al. |
| 2011/0017431 | A1 | 1/2011 | Yang et al. |
| 2011/0150036 | A1 | 6/2011 | Lee et al. |
| 2011/0154558 | A1 | 6/2011 | Peter et al. |
| 2012/0227778 | A1 | 9/2012 | Leonov |
| 2013/0087180 | A1 | 4/2013 | Stark et al. |
| 2014/0146116 | A1 | 5/2014 | Paschkewitz |

OTHER PUBLICATIONS

Chapter 15, "Ink Jet Printing", 14 pages, found at http://www.lintech.org/comp-per/15INK.pdf.
Marple, A. and Liu, Y.H.: "Characteristics of Laminar Jet Impactors", Environmental Science & Technology, vol. 8, No. 7, Jul. 1974, pp. 648-654.
Bailey, Adrian G.: "The Science and technology of electrostatic powder spraying, transport and coating", Journal of Electrostatics, vol. 45, 1998, pp. 85-120.
Domnick, et al.: "The Simulation of Electrostatic Spray Painting Process with High-Speed Rotary Bell Atomizers. Part II: External Charging", Part. Part. Syst. Charact. vol. 23, 2006, pp. 408-416, URL: http://www.ppsc-journal.com.
Kelly, Ryan T, et al..: "The ion funnel: theory, implementations, and applications", Mass Spectrometry Reviews,vol. 29, 2010, pp. 294-312.
Crowe, Clayton et al.: "Multiphase Flows With Droplets and Particles", CRC Press, LLC, 1998.
Bhat, Pradeep P., "Formation of beads-on-a-string structures during break-up of viscoelastic filaments," Aug. 2010, vol. 6:625-631, Nature Physics, 7 pages.
Le, Hue P., "Progress and Trends in Ink-jet Printing Technology," Jan./Feb. 1998, vol. 42:49-62, Journal of Imaging Science and Technology, 16 pages, found at: http://www.imaging.org/ist/resources/tutorials/inkjet.cfm.
Oliveira, Monica S., "Iterated Stretching, Extensional Rheology and Formation of Beads-on-a-String Structures in Polymer Solutions," Jan. 20, 2006, Special Issue of JNNFM on Extensional Flow, MIT, Cambridge, MA, 36 pages.
Owen, M., "Misting of non-Newtonian Liquids in Forward Roll Coating," Jul. 13, 2011, Journal of Non-Newtonian Fluid Mechanics, vol. 166:1123-1128, 6 pages.
Shi, X.D., "A Cascade of Structure in a Drop Falling from a Faucet," Jul. 8, 2004, vol. 265:219-222, Science, 4 pages.
McClure, Max, "Stanford Researchers' Cooling Glove Better than Steroids—and Helps Solve Physiological Mystery Too", Stanford Report, Aug. 29, 2012, 3 pages, retrieved from the Internet: http://news.stanford.edu/news/2012/august/cooling-glove-research-082912.html, retrieved on Dec. 19, 2014.
Matheson, Rob, "Cool Invention Wins First Place at MADMEC", MIT News Office, Oct. 17, 2013, 3 pages, retrieved from the Internet: http://newsoffice.mit.edu/2013/madmec-design-competition-1017, retrieved on Dec. 19, 2014.
Vanhemert, Kyle, "MIT Wristband Could Make AC Obsolete", Wired.com, Oct. 30, 2013, retrieved from the Internet: http://www.wired.com/2013/10/an-ingenious-wristband-that-keeps-your-body-at-theperfect-temperature-no-ac-required/, retrieved on Dec. 19, 2014.
Francioso, L., "Flexible thermoelectric generator for ambient assisted living wearable biometric sensors", Journal of Power Sources, vol. 196, Issue 6, Mar. 15, 2011, pp. 3239-3243.
http://www.stacoolvest.com/, retrieved on Dec. 19, 2014.
http://www.steelevest.com/, retrieved on Dec. 19, 2014.
http://veskimo.com/, retrieved on Dec. 19, 2014.
http://glaciertek.com/, retrieved on Dec. 19, 2014.
Chen, A., "Dispenser-printed planar thick-film thermoelectric energy generators," J. Micromech. Microeng., 21(10), 2011.
Hewitt, A.B., "Multilayered Carbon Nanotube/Polymer Composite Based Thermoelectric Fabrics," Nano Letters, 12 (3), pp. 1307-1310, 2012.
Arens, E., "Partial- and whole-body thermal sensation and comfort—Part I: Uniform environmental conditions," Journal of Thermal Biology, vol. 31, Issues 1-2, Jan. 2006, pp. 53-59.
Arens, E., "Partial- and whole-body thermal sensation and comfort—Part II: Non-uniform environmental conditions," Journal of Thermal Biology, vol. 31, Issues 1-2, Jan. 2006, pp. 60-66.
Bullis, Kevin, "Expandable Silicon", MIT Technology Review, Dec. 14, 2007, URL: http://www.technologyreview.com/news/409198/expandable-silicon/, retrieved from the Internet on Dec. 23, 2014.
"Ortho-Planar Spring", BYI Mechanical Engineering Website, URL: http://compliantmechanisms.byu.edu/content/ortho-planar-spring, retrieved from the Internet on Dec. 23, 2014.
S.-J. Kim, J.-H Wea and B.-J. Cho: "A wearable thermoelectric generator fabricated on a glass fabric," Energy Environmental Science, 2014.
L. Francioso, C. De Pascali, A. Taurino, P. Siciliano, A. De Risi: "Wearable and flexible thermoelectric generator with enhanced package," In Proc. SPIE 8763, Smart Sensors, Actuators, and MEMS VI, 876306, May 2013.
C. Huizenga, H. Zhang, E. Arens, D. Wang: "Skin and core temperature response to partial-and whole-body heating and cooling," Journal of Thermal Biology, vol. 29, Issues 7-8, Oct.-Dec. 2004, pp. 549-558.
Sholin, V. et al.: "High Work Function Materials for Source/Drain Contacts in Printed Polymer Thin Transistors," Applied Physics Letters, vol. 92, 2008.
Zhou, Li, et al.: "Highly Conductive, Flexible, Polyurethane-Based Adhesives for Flexible and Printed Electronics," Advanced Functional Materials, vol. 23, p. 1459-1465, wileyonlinelibrary.com.

\* cited by examiner

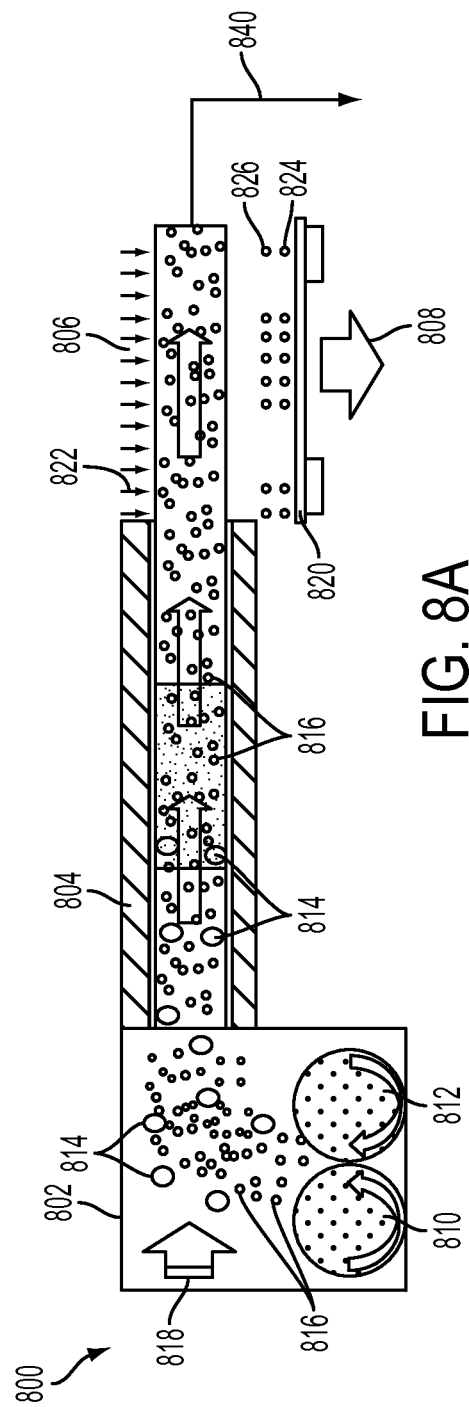
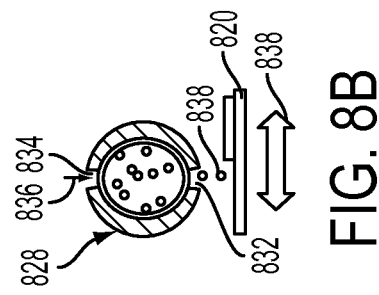
FIG. 8A
FIG. 8B

POLYMER SPRAY DEPOSITION METHODS AND SYSTEMS

RELATED APPLICATIONS

This application is related to U.S. patent application Ser. No. 14/066,418, filed Oct. 29, 2013, entitled "Methods and Systems for Creating Aerosols," and U.S. patent application Ser. No. 14/066,435, filed Oct. 29, 2013, entitled "Methods and Systems for Creating Aerosols."

BACKGROUND OF THE INVENTION

Custom manufacturing of parts is a growing industry and has wide ranging applications. Traditionally, injection molding machines and other machining techniques were used to create models of objects or to create the objects themselves. More specifically, heated materials like glass, metals, thermoplastics, and other polymers are injected into an injection mold specifically formed in the shape of the desired object. The material is allowed to cool in the mold and take on the shape of the mold to form the object. Injection molds are expensive and time-consuming to create and changes to the shape of the object are difficult to accommodate without further increasing the time and expense of creating the object.

The additive manufacturing industry arose in response to the expense, time, and difficulty in changing injection molds to create models or objects themselves. Known additive manufacturing techniques include fused deposition modeling (FDM), stereolithography (SLA), selective laser sintering (SLS), and jetting systems among others. Each known additive manufacturing technique has limitations in materials, expense, and/or volume capabilities that prevent the production of small run, customized manufacturing and prototyping using a complete set of thermoplastic materials. Further, known additive manufacturing techniques are unable to accurately create a part with mechanical properties, surface finish, and feature replication of the quality object produced by traditional techniques like injection molding.

In situations in which additive manufacturing does not produce parts of sufficient performance for an application, an entire industry of rapid computer numerical control (CNC) machining and rapid injection molding using low cost tools has arisen. However, these techniques are significantly more expensive than additive manufacturing techniques and have their own process limitations.

The industry was forced to decide between a high quality, high volume capability object produced by the traditional, but expensive, inflexible, and time-consuming techniques like injection molding and additive manufacturing techniques that produced a lower quality object, perhaps without the desired structural integrity, and sometimes without the desired materials, but with greater speed and flexibility. For example, FDM and SLS are limited in the type of material able to be used and create a less than 100% density object. Rapid CNC molding has better quality objects with great feature detail and finishes, but remains expensive. Prototypes created with the known additive manufacturing techniques are often refined until a final design is selected at which point an injection mold is created for large scale, high quality injection molding production. Such a multi-phase production process is also time-consuming and expensive.

The manufacturing industry would benefit from a manufacturing process that realizes the advantages of digital, additive manufacturing with a broad set of thermoplastic materials and feature resolution to be capable of manufacturing objects with the complexity and structural integrity obtained using more traditional manufacturing techniques.

BRIEF DESCRIPTION OF THE DRAWINGS

FIG. 8A is an example polymer spray deposition system.

FIG. 8B is a nozzle in the example polymer spray deposition system shown in FIG. 8A.

DETAILED DESCRIPTION

The disclosed polymer spray deposition systems and methods help realize benefits of three-dimensional, digital, additive manufacturing techniques with a broader range of thermoplastic materials and with feature size resolution of the produced objects similar in complexity and structural integrity to more traditional manufacturing techniques, such as injection molding processes. The disclosed polymer spray deposition systems and methods can aerosolize and create three-dimensional objects out of high molecular weight polymers and solutions thereof and other thermoplastics, such as nylon, polystyrene, polycarbonate, polypropylene, polysulfone, and acetal. The polymer spray deposition systems and methods can aerosolize any Newtonian and non-Newtonian fluids having highly visco-elastic properties.

Figure 1A:
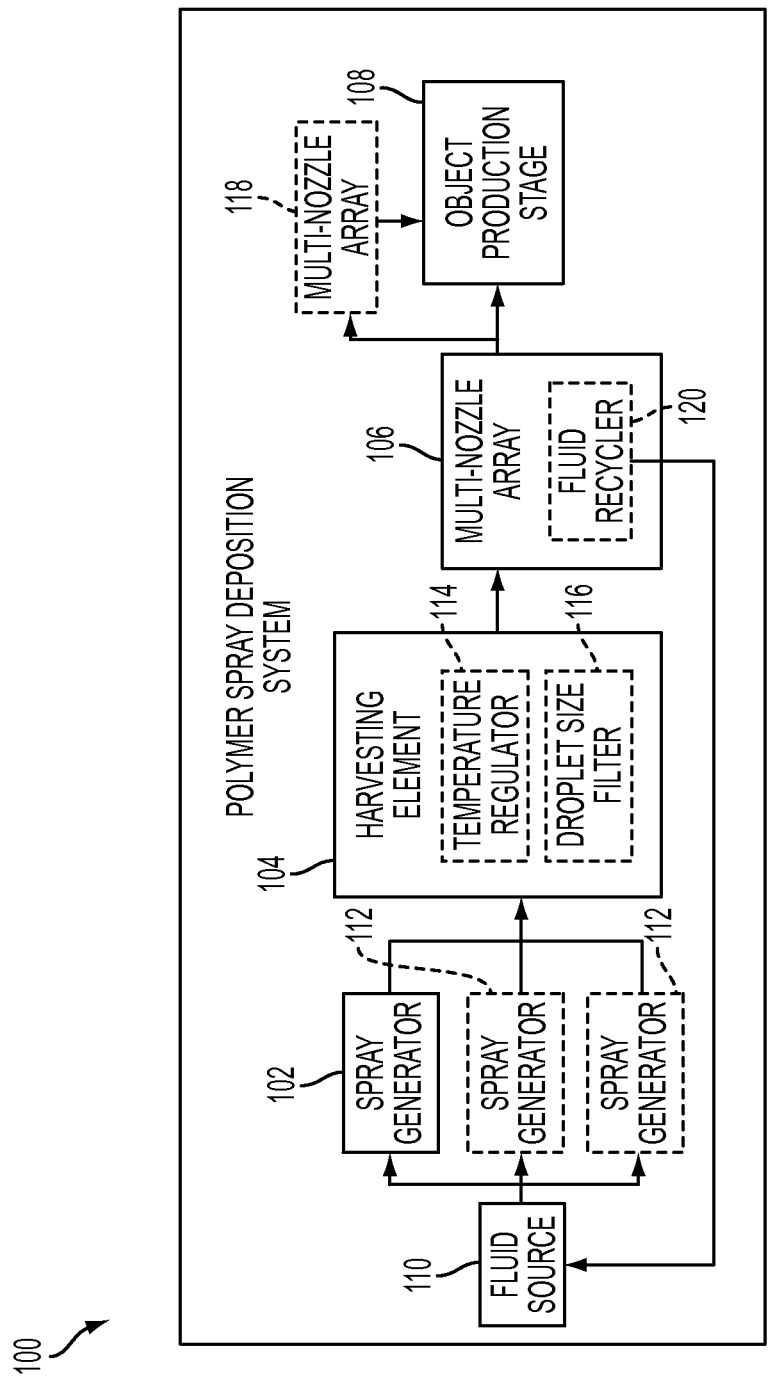
FIG. 1A is a block diagram of a polymer spray deposition system, according to aspects of the disclosure.

FIG. 1A shows a block diagram of an example polymer spray deposition system 100 that includes a spray generator 102, a harvesting element 104, a multi-nozzle array 106, and an object production stage 108. The spray generator 102 receives fluid from a fluid source 110 and generates a plurality of fluid droplets that form a spray. The plurality of fluid droplets is generated by fluid stretching techniques in which a fluid is stretched to form a fluid filament. The fluid filament breaks into a plurality of droplets that form the spray. Examples of fluid stretching methods and systems are discussed in U.S. patent application Ser. No. 14/066,418 and U.S. patent application Ser. No. 14/066,435, both entitled "METHODS AND SYSTEMS FOR CREATING AEROSOLS," and both commonly owned by the assignee of this application and both incorporated by reference herein in their entirety.

Figure 2A:
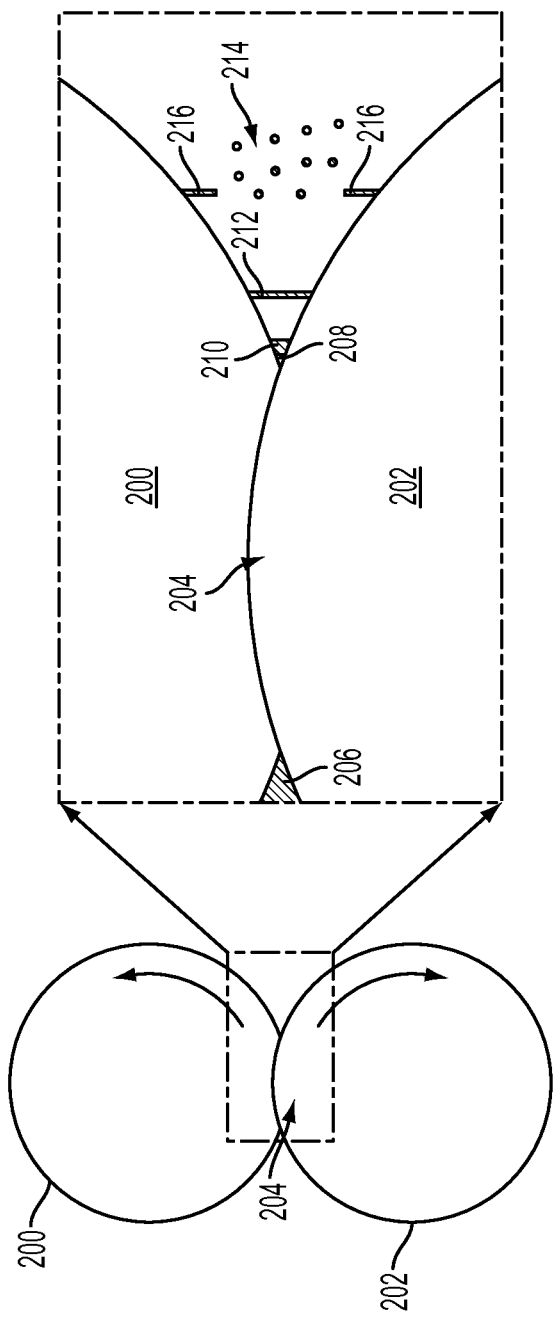
FIG. 2A shows an example two roller spray generator.
Figure 2B:
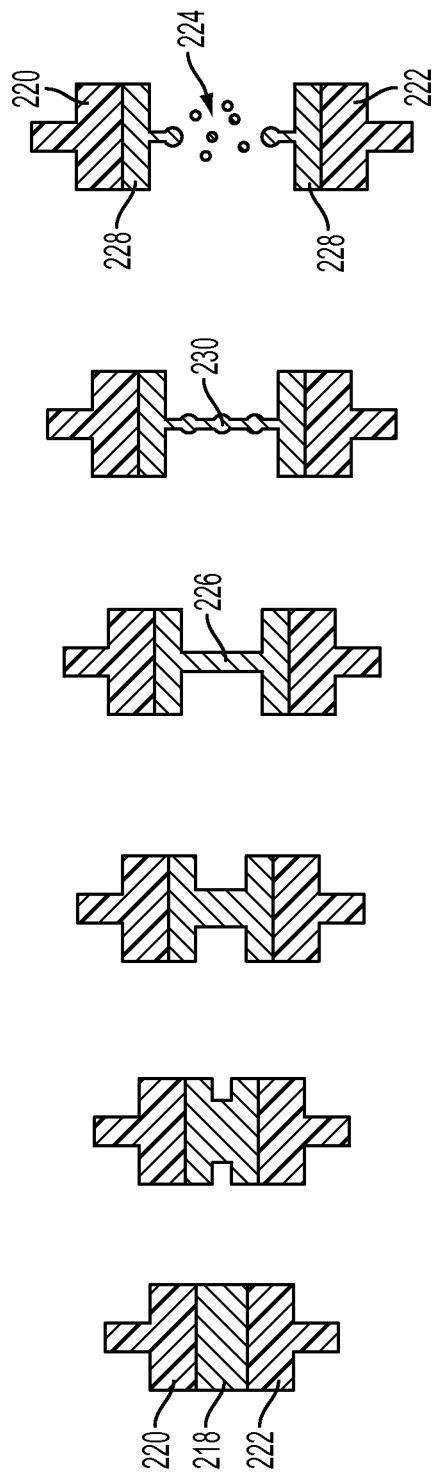
FIG. 2B shows an example two piston spray generator.
Figure 3:
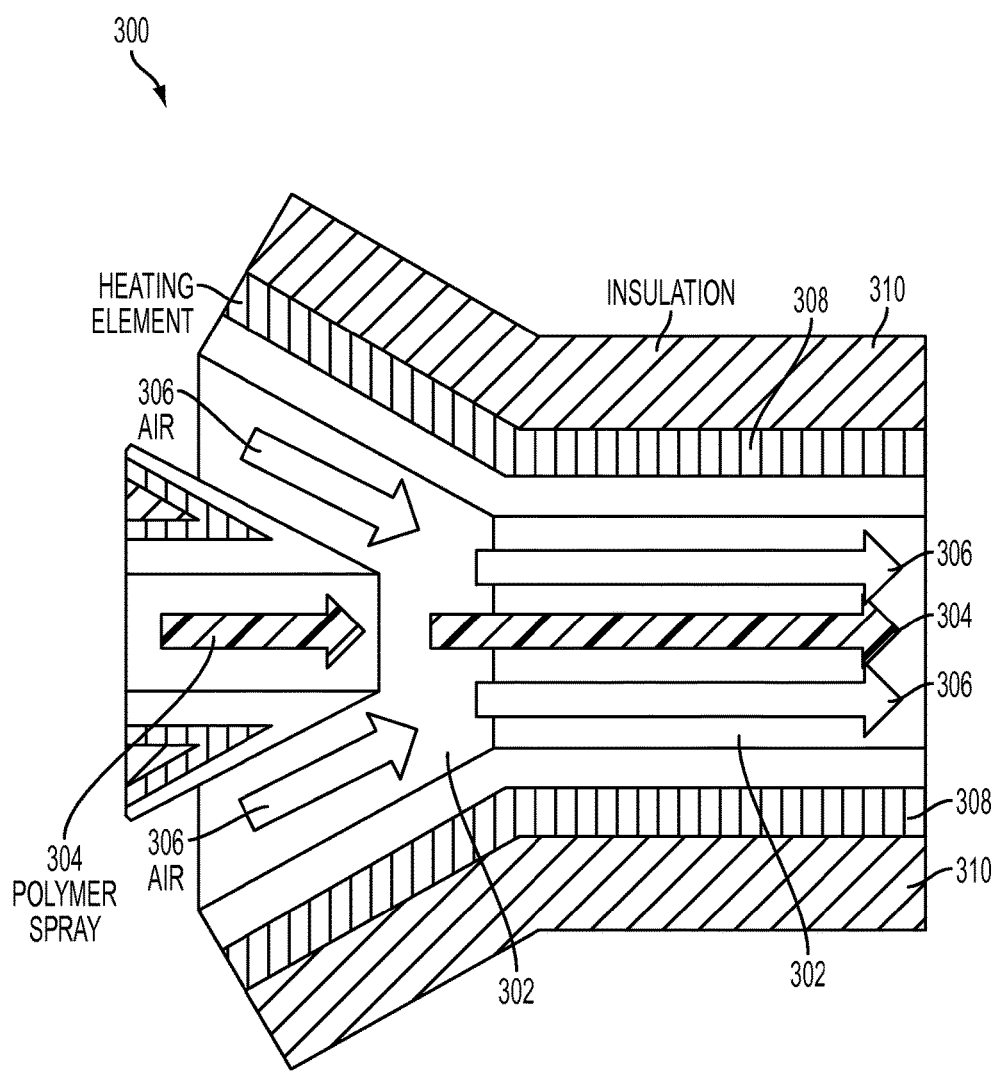
FIG. 3 shows an example harvesting element that includes transport channels.

FIGS. 2A and 2B show example spray generator methods and systems that generate a plurality of fluid droplets by stretching the fluid between two diverging surfaces into a fluid filament until the fluid filament breaks into a plurality of droplets that form a spray. Other suitable methods of stretching fluids between two diverging surfaces can be accomplished using a variety of options including multiple rollers arrangements, rollers that co-rotate, rollers that counter-rotate, rollers within rings or belts, and the like.

FIG. 2A shows a progression of fluid that is stretched by a pair of counter-rotating rollers 200, 202. A nip 204 is defined as the space between the two rollers 200, 202 into which the fluid is drawn when the rollers 200, 202 counter-rotate. The fluid pools at an upstream side 206 of the nip 204 and is drawn through the nip 204. On a downstream side 208 of the nip 204, the fluid is stretched between the diverging surfaces of the two counter-rotating rollers 200, 202 into a fluid filament 210. As the rollers 200, 202 counter-rotate, the diverging surfaces of the rollers 200, 202 to which the fluid filament 210 adheres remains the same, but the space between such surfaces is greater. The fluid filament 212 grows longer and thinner as the surfaces of the rollers 200, 202 rotate away from each other.

When the fluid filament 212 reaches a point of the liquid bridge becoming unstable, which is also the capillary break-up point for the fluid filament 212, the fluid filament 212 breaks up into several droplets 214 and may leave excess fluid 216 behind on each of the roller's surface. The excess fluid 216 retracts to the surface of its respective roller and can be part of the fluid that is recycled and pools on the upstream side of the nip to be again drawn through the nip on the next rotation of the rollers. The process can be repeated to provide a continuous mist.

FIG. 2B shows a progression of fluid 218 that is stretched between a pair of pistons 220, 222 to form a fluid filament that eventually breaks up into a plurality of droplets 224. Fluid 218 is placed between the pistons 220, 222. The pistons 220, 222 are pulled apart and a continuous strain is applied to cause the fluid 218 to stretch between the pistons 220, 222 and form a fluid filament 226. As the fluid filament 226 grows longer and thinner, the fluid filament 226 eventually reaches its capillary break-up point at which point it breaks into multiple droplets 224 and leaves excess fluid 228 behind on the surface of each piston 220, 222. FIG. 2B also shows a beads-on-a-string structure 230, which is the precursor to the fluid filament reaching its capillary break-up point at which point the fluid filament breaks into the plurality of droplets 224. Excess fluid 228 is pooled on the pistons 220, 222 and the pistons 220, 222 can be brought back together and the fluid stretched again, thereby repeating the process and forming additional mist droplets.

Referring back to FIG. 1A, the polymer spray deposition system 100 can include multiple spray generators 112. The multiple spray generators 112 can generate droplets in parallel with the main spray generator 102. All of the spray generators 102, 112 receive fluid from the same fluid source 110 in the example embodiment shown in FIG. 1A. The multiple spray generators 102, 112 each generate a plurality of droplets that together form the spray. The harvesting element 104 entrains the formed spray from the multiple spray generators 102, 112 into the carrier gas flow.

The harvesting element 104 is a delivery system that can provide sufficient velocity to transport the droplets generated by the spray generators 102, 112 from the spray generators 102, 112 to the multi-nozzle array 106 and from the multi-nozzle array 106 to the target surface on which the three-dimensional object is created. The harvesting element 104 also provides a uniform steady flow to smoothly transport the droplets to the multi-nozzle array to prevent coalescence or agglomeration of the droplets from occurring.

The harvesting element 104 can include an optional temperature regulator 114 that regulates the temperature of the carrier gas flow. For example, the fluid is a thermoplastic that has a particular melting point. When the thermoplastic droplets are entrained by the harvesting element 104 into the carrier gas flow, the temperature regulator 114 maintains the thermoplastic droplets in the carrier gas flow at a temperature above their melting point to keep the thermoplastic droplets in droplet form. If the temperature of the thermoplastic droplets drops below their melting temperature, the droplets may harden or freeze and be incapable of or less efficient at being directed through the multi-nozzle array 106. The harvesting element 104 provides temperature uniformity to the droplets entrained in the carrier gas flow along the entire flow path of the harvesting element 104 to maintain their melting temperature and ensure that the droplets can be directed through the multi-nozzle array(s).

For example, FIG. 3 shows an example harvesting element 300. The harvesting element can be a sheath flow design 300 having a transport channel 302 within which the polymer spray 304 travels. The polymer spray 304 is radially surrounded by an air layer 306, which is often heated to a temperature that maintains the polymer spray 304 above its melting temperature. The air layer 306 is surrounded by a heating element 308, such as a resistive pipe heater, that helps to keep one or both of the air flow 306 and the polymer spray 304 at a desired temperature above the melting temperature of the polymer spray 304. Optional insulation 310 can be included, as shown in FIG. 3, to increase the efficiency and help maintain the temperature of the polymer spray 304.

Referring again to FIG. 1A, the harvesting element 104 can also include a droplet size selector 116. The droplet size selector 116 controls the size of the droplets that are transported to the multi-nozzle array 106. Controlling the size of the droplets that are transported to the multi-nozzle array 106 and are ultimately directed onto the target surface to create the three-dimensional object controls the resolution of the three-dimensional object. Smaller droplets directed from the multi-nozzle array to the target surface achieve a higher resolution three-dimensional object. The size of the droplets can be adjusted by an adjustment mechanism that controls the size of the droplets transported to the multi-nozzle array. The size of the droplets needed to create the desired three-dimensional object is application dependent and may vary even within the process of creating a single object.

Some example droplet size selectors include inertial impaction using flow manifold geometry and trapping features, vortex concentration and separation techniques, and electrostatic steering. The type of droplet size selector may be selected based on the geometry and throughput of the overall polymer spray deposition system 100.

One example inertial impaction technique is shown in FIG. 4A. The flow path 400 on the left shows that droplets 402, 404 have different sizes and take different paths 406, 408, respectively, when they flow toward a bend like a divider 410 or wall in the flow path 400. The inertia of the larger droplets is greater than the inertia of the smaller droplets. When the entrained carrier gas flow encounters a wall, divider, or other object, the larger droplets are not able to or less efficiently traverse the object and allow the smaller droplets to maneuver around the object and continue along the desired flow path.

For example, the droplet size selector can include multiple dividers 414 and walls 416 that define a flow path 418 that produces an entrained carrier gas flow 420 having a desired droplet size. The droplets that exceed the desired size are unable to bend around the geometry of the flow path 418 created by the dividers 414 and the walls 416. The shape, length, size, contour, texture, materials, and other features of the dividers 414 and walls 416 can be adjusted to produce a carrier gas flow 420 having the desired droplet size.

Figure 4A:
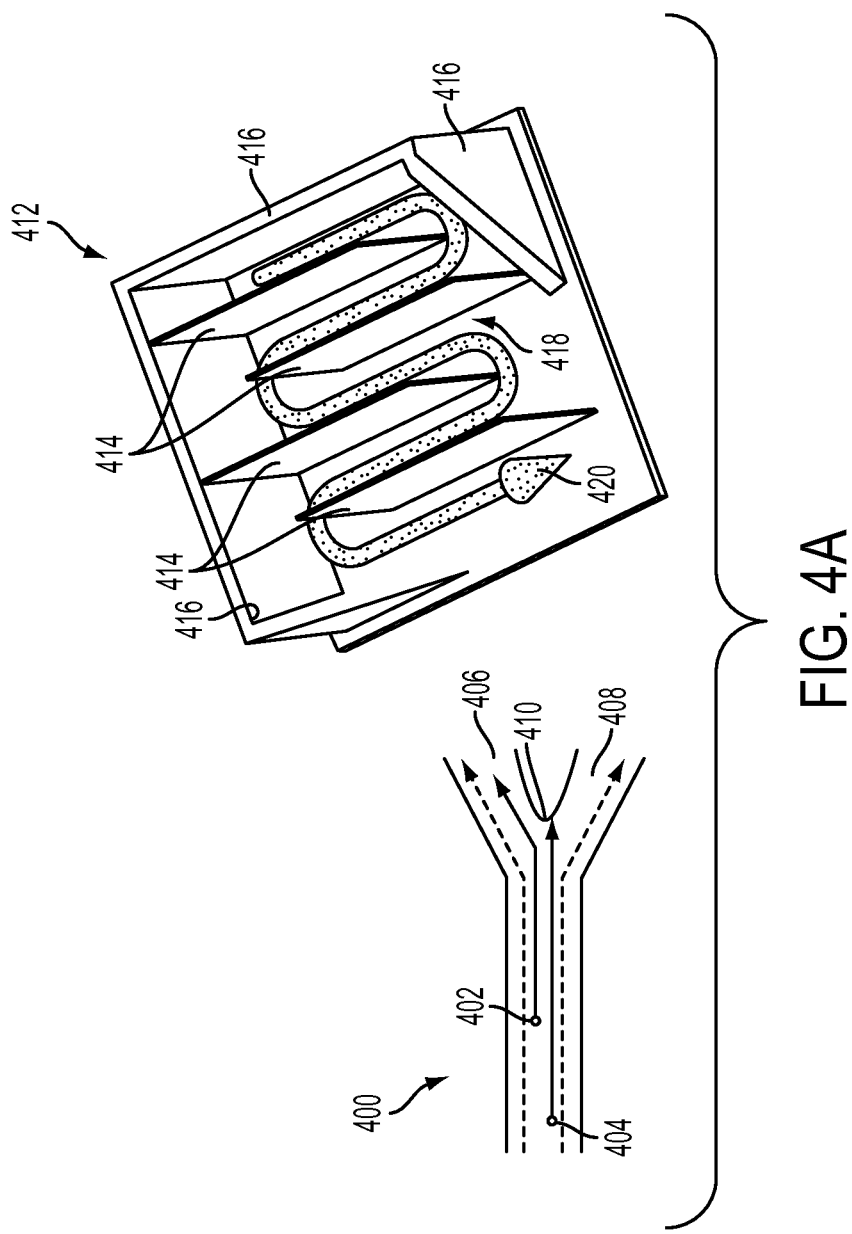
FIG. 4A is an example droplet size selector.
Figure 4B:
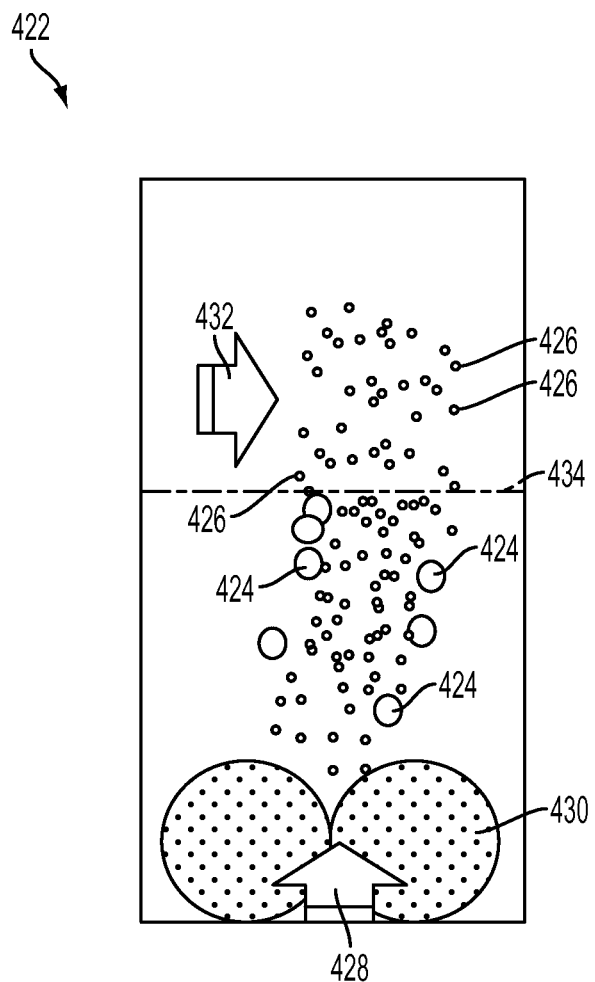
FIG. 4B is another example droplet size selector.

FIG. 4B shows another type of droplet size selector 422 that relies on gravity to settle out larger droplets 424 from smaller droplets 426 when the polymer spray 428 is emitted from the spray generator 430. The force of gravity causes the larger droplets 424 to fall back down to the spray generator 430. In some cases, the larger droplets 424 that fall back down are recycled back into the polymer spray deposition system and can be fluid that is stretched again and caused to become a new set of droplets by the spray generator 430. An optional air flow 432 can be directed toward to the smaller droplets 426, in this case at a perpendicular angle with respect to the direction from which the droplets are ejected from the spray generator. The air flow 432 directs the smaller droplets along the transport channel toward the multi-nozzle array. The air flow 432 is positioned above a separation line 434 that is defined as the point at which the larger droplets 424 drop back down to the spray generator 430.

Referring again back to FIG. 1A, the polymer spray deposition system 100 can include multiple multi-nozzle arrays 106, 118 for directing the spray onto the target surface. The polymer spray deposition system 100 can include any suitable number of multi-nozzle arrays. The example shown in FIG. 1A includes two multi-nozzle arrays 106, 118 that each receives the carrier gas flow from the harvesting element 104 and directs the droplets onto the target surface to form the three-dimensional object. The number of multi-nozzle arrays can both increase the resolution of the three-dimensional object and increase the efficiency of the creation of the 3D object. For example, in some cases the second multi-nozzle array could include a coarse resolution nozzle to fill in large portions of the structure. In another example, increasing the number of multi-nozzle arrays increases the resolution of the formed three-dimensional object. Further, in multiple, multi-nozzle arrays systems, individual multi-nozzle arrays can be turned on and off individually to further refine and control the resolution of the formed three-dimensional object by controlling the concentration, droplet size, and direction of the carrier gas flow as it is directed toward the target surface.

In any multi-nozzle array system, the individual nozzles of the multi-nozzle array can be turned on and off to provide detailed control of the geometry, concentration, droplet size, direction, etc. of the carrier gas flow as it is directed toward the target surface, which affects and controls the overall resolution and shape of the formed three-dimensional object.

In some example systems, such as the polymer spray deposition system 100 shown in FIG. 1A, the multi-nozzle array includes a fluid recycler 120. The fluid recycler 120 recycles the droplets that are not directed from the multi-nozzle array 106 onto the target surface by sending the recycled fluid back to the fluid source 110.

Figure 5:
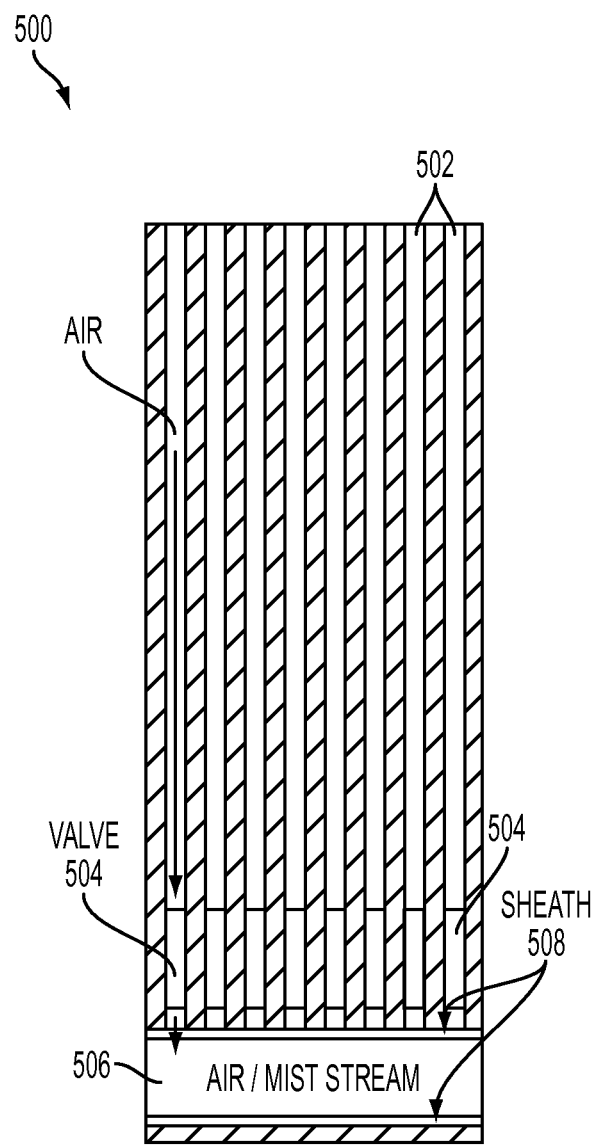
FIG. 5 is an example multi-nozzle array.
Figure 6B:
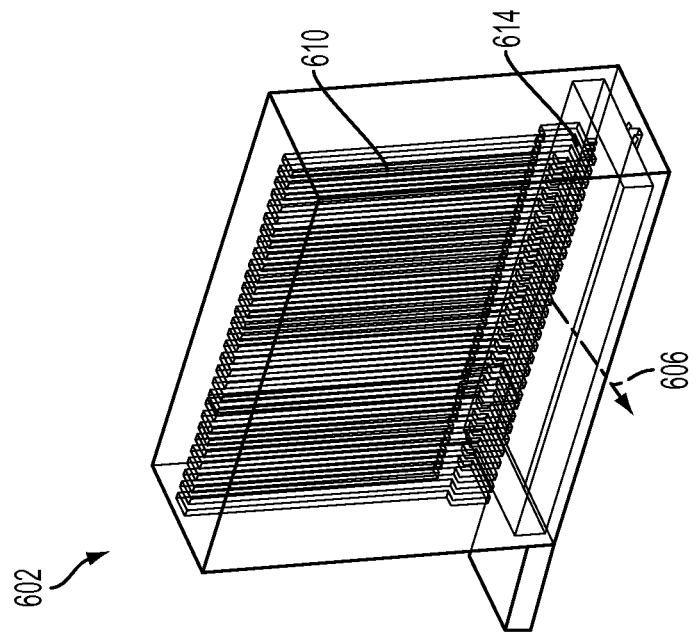
FIGS. 6A and 6B are example multi-nozzle arrays having air flow circulating perpendicular to the nozzles.
Figure 6A:
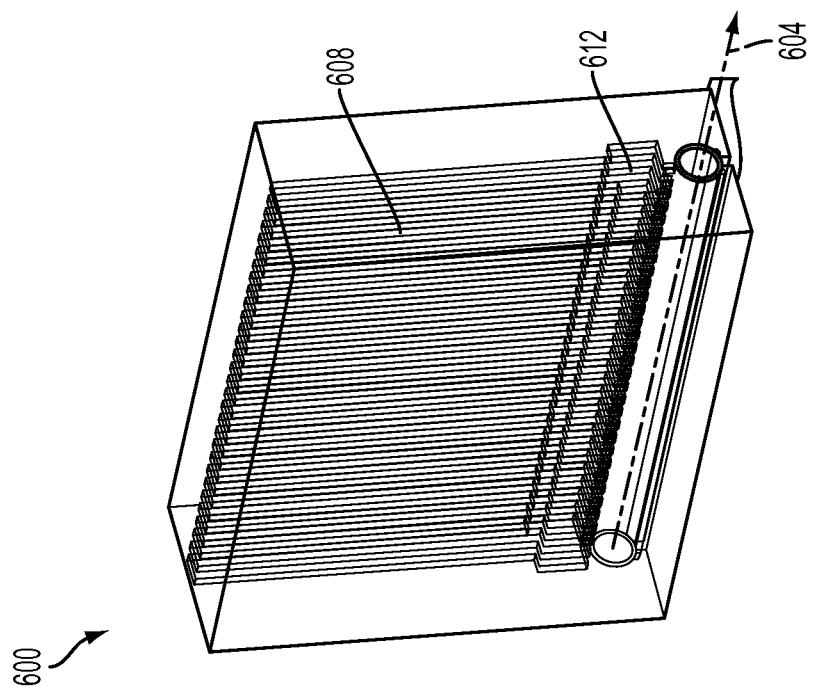
Figure 7:
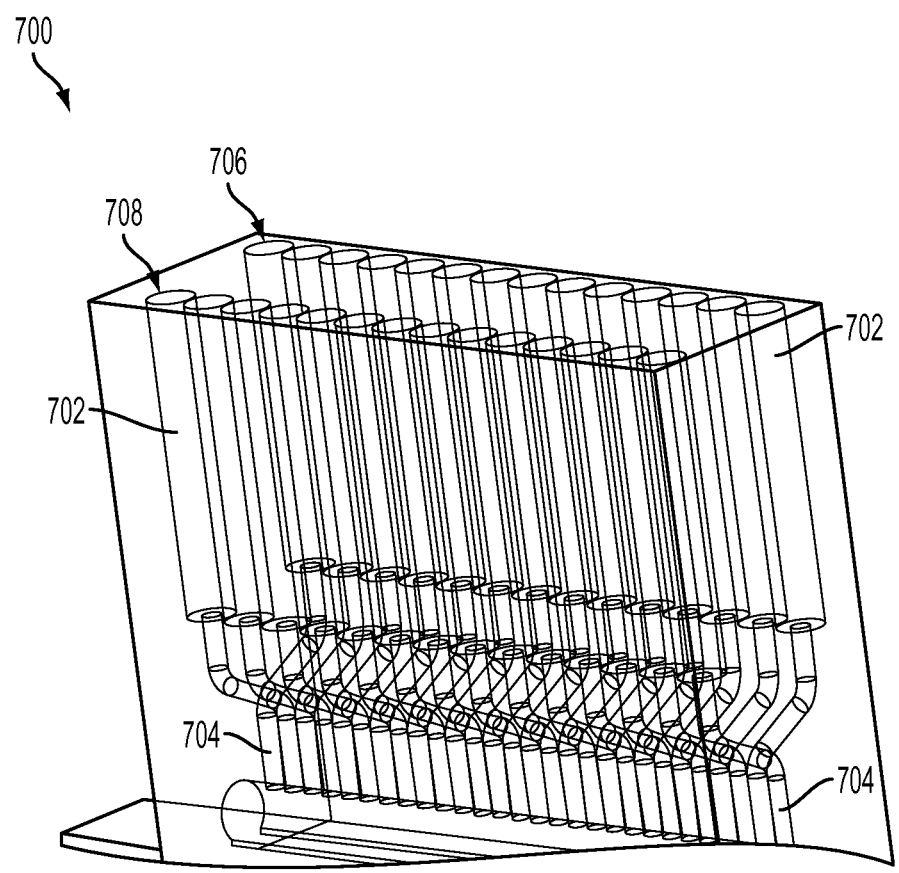
FIG. 7 is another example multi-nozzle array.
Figure 9:
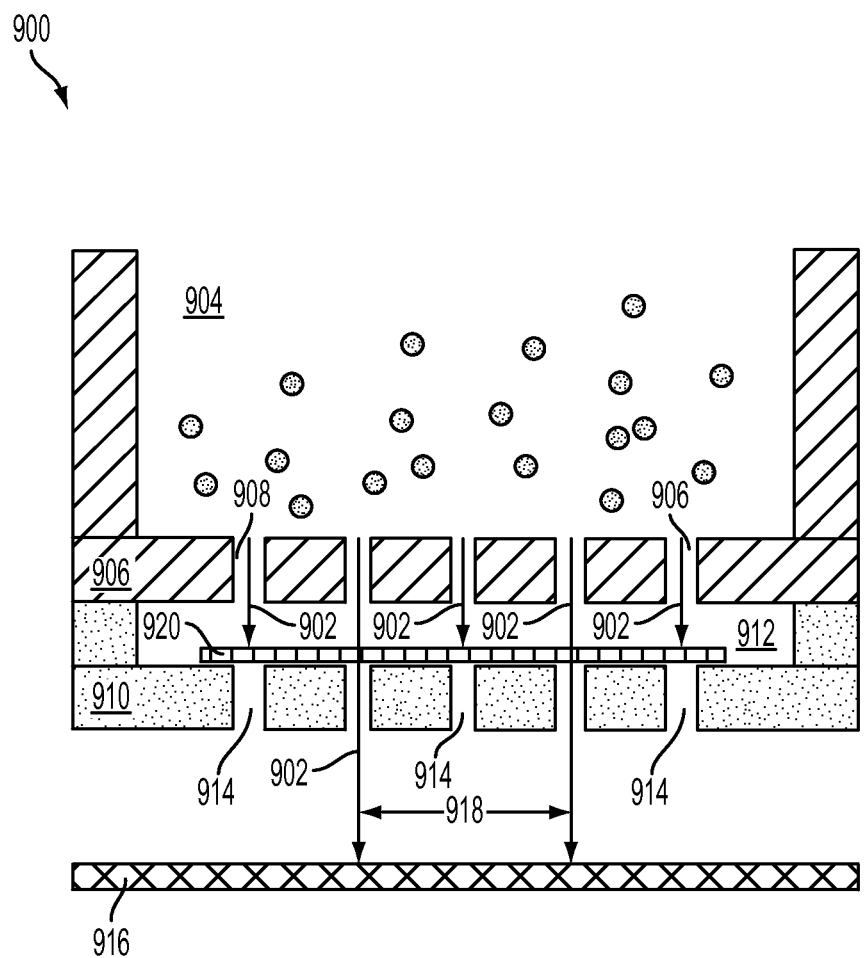
FIG. 9 is an example gating mechanism for directing the spray onto a target surface.
Figure 10A:
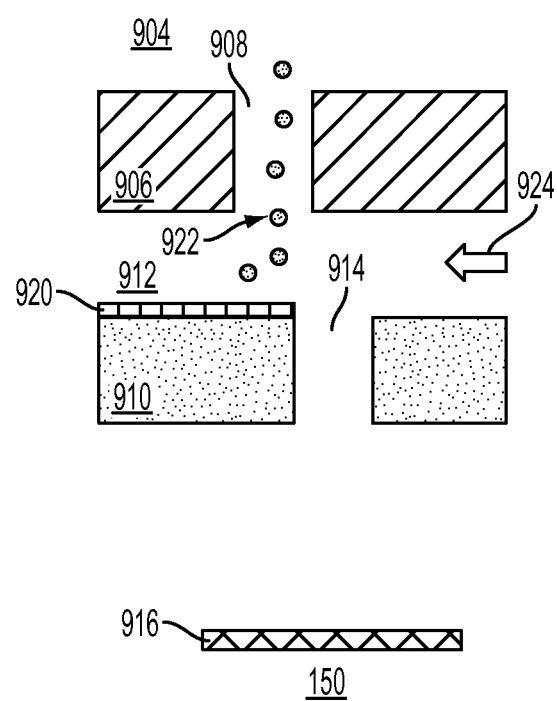
FIG. 10A shows an individual nozzle in the off position from the gating mechanism shown in FIG. 9.
Figure 10B:
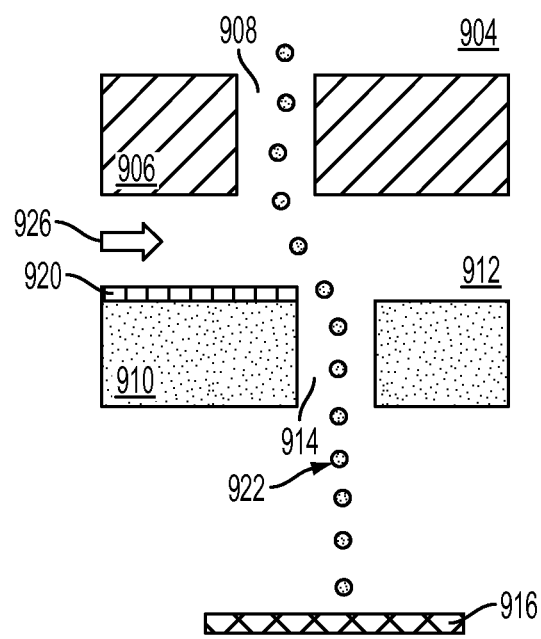
FIG. 10B shows an individual nozzle in the on position from the gating mechanism shown in FIG. 9.

FIG. 5 shows an example multi-nozzle array 500 having a plurality of nozzles 502 that each has a respective valve 504. The carrier gas flow is pneumatically directed through the nozzles 502 of the multi-nozzle array 500. The exit of the carrier gas flow from each nozzle 502 is controlled by a valve 504. The valves 504 of all of the nozzles 502 can be turned on either at the same time, in groups, or individually, to direct the carrier gas flow toward the target surface. Each nozzle has an orifice having a diameter ranging from 1 to 100 microns, depending on the resolution of the device. The orifice controls the volume of droplets directed from the nozzle onto the target surface and the size of the area the droplets are directed onto.

For example, a smaller orifice that permits only a single droplet or a small number of droplets to be directed from each nozzle onto the target surface increases the resolution of the formed three-dimensional object on the target surface. In comparison, a larger orifice permits a larger number of droplets to be dispensed from the nozzle onto the target surface, which reduces the resolution, but increases the volume of the applied droplets. In some examples, nozzles within the same multi-nozzle array have the name size orifices and in other examples the orifice size of the nozzles in the same multi-nozzle array can be different. In yet other examples, the orifice size of the nozzles within the same multi-nozzle array can be adjusted in size, which allows the resolution of the formed three-dimensional object to be adjusted as well.

Referring again to FIG. 5, the multi-nozzle array has a continuously circulating carrier gas flow that is pneumatically directed to the target surface through the nozzle 502 and valve 504 combinations. The nozzles 502 direct the carrier gas flow into a transport tube 506. A sheath gas source emits a sheath gas 508 that radially surrounds the transport tube 506 and circulates near the nozzles to prevent freezing the droplets in the carrier gas flow and to prevent leakage from the nozzles 502 to the transport tube 506.

In some examples, the sheath gas flows 604, 606 are perpendicular to the nozzles 608, 610, such as in the example multi-nozzle arrays 600, 602 shown in FIGS. 6A and 6B. In the multi-nozzle array 600 shown in FIG. 6A, the sheath gas flow 604 is perpendicular to the nozzles 608 and along the axis of the valves 612. The multi-nozzle array 602 shown in FIG. 6B has a sheath gas flow 604 that is perpendicular to the nozzles 610 and is also perpendicular to the axis of the valves 614. In the example multi-nozzle arrays 600, 602 shown in FIGS. 6A and 6A, the valves 612, 614 are planar valves depicted in a square shape.

FIG. 7 shows an alternative multi-nozzle array 700 having a plurality of nozzles 702 and respective valves 704. In this example, the valves 704 are offset from the nozzles 702 to increase the allowable spacing for the nozzles 702. The valves 704 are positioned adjacent to each other and each is connected to a respective nozzle 702. The nozzles 702 are arranged in two rows 706, 708 in which nozzles 702 from one row 706 connect to a respective valve 704 in alternate succession with nozzles 702 from the other row 708. Any suitable arrangement for the nozzles to connect to the valves can be implemented and can be based on the physical spacing available in the multi-nozzle array, in some examples.

FIG. 8A is an example polymer spray deposition system 800 having a spray generator 802, a harvesting element 804 or delivery system, a multi-nozzle array 806, and an object production stage 808. The spray generator 802 is a two-roller 810, 812 embodiment that stretches fluid into fluid filaments between the diverging surfaces of the two counter-rotating rollers. The spray generator 802 generates a plurality of droplets that includes large droplets 814 and small droplets 816. The small droplets produced by the spray generator can be in the range of ≤10 microns, in some examples. An air flow 818 is directed toward the generated fluid droplets 814, 816 to guide them toward the harvesting element 804.

As discussed above, the fluid can be any fluid, including highly viscoelastic polymers and solutions thereof, such as high temperature thermoplastic melts or solutions thereof.

Any suitable amount of solvent can be added to the fluid and can help control the concentration of the fluid and thus the size of the droplets generated by the spray generator.

The example harvesting element 804 shown in FIG. 8A includes insulated tubing, with insulation, sheath flow, and filtration, as discussed above in the sheath flow design harvesting element 300 and as shown in FIG. 3. This harvesting element 804 relies on an inertial impactor to separate the small droplets 816 from the large droplets 814. The harvesting element 804 transports the small droplets 816 to the multi-nozzle array 806. The multi-nozzle array 806 digitally controls the direction of the droplets onto the target surface 820. A cross-flow of air 822 is directed toward the multi-nozzle array 806 to cause single droplets of the fluid to be directed toward the target surface 820, as discussed below and as shown in FIG. 8B. Excess droplets can be recycled back into the fluid source to be provided to the spray generator 802 through a recycling pathway 840.

The object production stage 808 is translated with respect to the multi-nozzle array 806 for each layer of the droplets that are directed from the multi-nozzle array 806 toward the target surface 820. A first layer 824 of the three-dimensional object is created when the multi-nozzle array 806 directs the first layer of the droplets 824 to form the first layer of the three-dimensional object. The object production stage 808 moves away from the multi-nozzle array 806 in a direction perpendicular to and away from the multi-nozzle array 806 so the system is ready to create the second layer of droplets 826.

The object production stage 808 continues to move with respect to the multi-nozzle array 806 based on the digital information about the three-dimensional object that is input to the polymer spray deposition system 800. In the example system shown in FIG. 8A, the object production stage 808 moves with respect to the multi-nozzle array 806. The multi-nozzle array 806, the harvesting element 804, and the spray generator 802 remain stationary while the object production stage 808 moves with respect to the multi-nozzle array 806 consistent with the digital information detailing the three-dimensional object that the system is creating. In other examples, the multi-nozzle array may also move with respect to the target surface and the object production stage may or may not move.

FIG. 8B shows one of the nozzles 828 of the multi-nozzle array of FIG. 8A that is directing droplets of the fluid toward the target surface 830. FIG. 8B shows a cross-sectional view of the nozzle 828 having an orifice 832 and an inlet opening 834. A pressure 836 can be applied to the nozzle through the nozzle's inlet opening 834 to cause single droplets 838 of the fluid to exit the nozzle 828 through the nozzle's orifice 832 to be directed toward the target surface 830. As discussed above, the polymer spray deposition system can selectively control the application of pressure to the nozzles and thus the direction of the fluid droplets toward the target surface. Any suitable substrate can be used as the target surface.

The individual nozzles within the multi-nozzle array are selectively turned on or off as the object production stage moves within respect to the multi-nozzle array to create the desired geometry for the three-dimensional object. Conventional additive manufacturing methods that use multi jet systems default to being off and then can be turned on to eject ink or not. The individual nozzle control system disclosed in this application provides a cross-flow system that has a continuous jet of droplets with on-demand or scheduled bursts of air or pressure that direct the droplets to be ejected from one or more nozzles of the multi-nozzle array toward the target surface.

The object production stage 808 controls the target surface 820 as the droplets are directed from the nozzles, such as the nozzle 828 shown in FIG. 8B. As discussed above, the object production stage 808 translates the target surface 820 in a direction perpendicular to and away from the multi-nozzle array 806 to create multiple layers of the three-dimensional object, layer by layer. FIG. 8B shows that the object production stage 808 can also translate in a direction 838 parallel to and along the axis of the orifices of the multi-nozzle array 806, which creates the shape, contour, texture, etc. of each layer of droplets directed toward the target surface 820. The object production stage 808 shown in FIGS. 8A and 8B translates in two directions with respect to the multi-nozzle array 806. In other examples, the object production stage can translate in any suitable direction(s) with respect to the multi-nozzle array.

FIG. 9 shows another embodiment of a multi-nozzle array 900 that includes a continuous inkjet gating mechanism that directs the carrier gas flow toward the target surface. Continuous jets of polymer droplets 902 are ejected from a main chamber 904 of the multi-nozzle array 900 through a first nozzle array 906 in the main chamber 904. Pressure applied to the main chamber 904 causes droplets to be ejected from the main chamber 904 through the main chamber openings 906 and into an intermediate chamber 912. The intermediate chamber 912 has a pressure that is less than the pressure of the main chamber 904 to allow for the flow of the droplets from the main chamber 904 to the intermediate chamber 912 and to prevent the flow of droplets from the intermediate chamber 912 back into the main chamber 904.

The intermediate chamber 912 includes a second nozzle array 910 having a plurality of openings 914. The openings 914 of the second nozzle array 910 are aligned with the openings 906 of the first nozzle array 906 to provide a through path for the droplets to be dispensed onto a target surface 916. As discussed above, continuous jets of polymer droplets 902 are ejected from the main chamber 904 into the intermediate chamber 912. However, individual nozzles in the second nozzle array 910 can be turned on and off to selectively eject droplets from the intermediate chamber 912 toward the target surface 916. Depending on whether an individual nozzle is turned on or off, the droplets are ejected from the individual nozzle. In the example mechanism shown in FIG. 9, the second nozzle array 910 has two nozzle pathways 918 in the on position and droplets are ejected from the two "on" nozzles onto the target surface 916.

A recovery gutter 130 can be positioned in the intermediate chamber 910. The recovery gutter 130 collects the droplets received from the first nozzle array 906 that are not passed through a nozzle that is turned on in the second nozzle array 910. The collected droplets can be recycled and reused in the spray generator in some examples.

FIGS. 10A and 10B show an individual nozzle of the multi-nozzle array shown in FIG. 9 in the off position and the on position, respectively. FIG. 10A shows the nozzle in the off position. The droplets are directed through the opening 908 of the nozzle in the first nozzle array 906 through which the continuous jet of polymer droplets 922 are ejected from the main chamber 904 to the intermediate chamber 912. In this example, the opening 908 of the first nozzle array and the opening 914 of the second nozzle array 910 are offset from each other. An optional gas jet 924 is used in this example to encourage the jet of polymer droplets 922 toward the recovery gutter 920 and away from the opening 914 of the nozzle in the second nozzle array 910. The gas jet 924 is directed at the opening 908 of the first nozzle array 906 at an angle perpendicular to the opening 908 and away from the opening 914 of the second nozzle array 910. Thus, the jet of polymer droplets 922 is not ejected through the opening 914 of the second nozzle array 910 when the nozzle is in the off position.

When the nozzle is in the on position, the jet of polymer droplets 922 is directed through the opening 914 of the second nozzle array 910 and onto the target surface 916. On demand, a directed pulse of air 926 is directed toward the jet of polymer droplets 922 in the opposite direction from the gas jet 924 used when the nozzle is turned off, but also perpendicular to the opening 908 of the first nozzle array 906. The directed pulse of air 926 causes the jet of polymer droplets 922 to be directed toward the opening 914 of the second nozzle array 910 and thus toward the target surface 916.

The pressure around and near the target surface 916 is ambient pressure, which is lower than the pressure of both the intermediate chamber 912 and the main chamber 904. In some alternative examples, the intermediate chamber 912 pressure can be equal to the ambient pressure around the target surface. The gas jet 924 and the directed pulse of air 926 are dispensed from nozzle arrays (not shown) that are matched to the first nozzle array 906 and the second nozzle array 910 and can be switched independently for each nozzle that dispenses droplets. Any suitable gating mechanisms can be included in the disclosed polymer spray deposition systems.

The polymer spray deposition systems disclosed herein can be embodied in a print head for a three-dimensional printer. The three-dimensional printers can include multiple print heads. In some multi-print head examples, one or more print head(s) can be used to print support material for the three-dimensional object and another one or more print head(s) can be used to print the primary material over the support material. Some of the support materials can be dissolvable so that they provide support while the three-dimensional object is created, but dissolve after the three-dimensional object is complete.

Figure 1B:
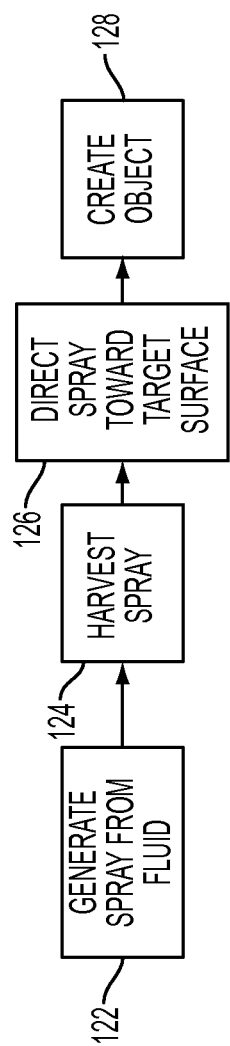
FIG. 1B show steps in a method of creating a three-dimensional object using polymer spray deposition systems and methods in accordance with the disclosure.

FIG. 1B shows a block diagram of steps in a method of generating a three-dimensional object using a polymer spray deposition system that includes generating spray from a fluid 122, harvesting the spray 124, directing the spray toward a target surface 126, and creating an object 128 from the directed spray.

Having described and illustrated the principles of the invention in a preferred embodiment thereof, it should be apparent that the invention can be modified in arrangement and detail without departing from such principles. I claim all modifications and variation coming within the spirit and scope of the following claims.

The invention claimed is:

1. A polymer spray deposition system, comprising:
a spray generator that receives a fluid from a fluid source and generates a plurality of fluid droplets by stretching the fluid between two diverging surfaces into a fluid filament until the fluid filament breaks into the plurality of droplets that form a spray;
a carrier gas flow to carry the spray from the spray generator and entrains the spray in a first direction;
a harvesting element that receives the spray from the spray;
a multi-nozzle array that receives the carrier gas flow with the entrained spray and generates a cross flow of air that pneumatically directs the carrier gas flow perpendicular to the first direction toward a target surface and causes at least some droplets of the entrained spray to reach the target surface while excess droplets are recycled back to the fluid source; and
an object production stage that controls the multi-nozzle array to repeatedly apply the carrier gas flow to the target surface to form a three-dimensional object on the target surface.

2. The polymer spray deposition system of claim 1, wherein the fluid is a solution of high molecular weight polymeric fluid.

3. The polymer spray deposition system of claim 1, wherein the spray generator includes two rollers that draw the fluid into an upstream side of a nip defined between the two rollers and cause the fluid to stretch between the respective diverging surfaces of the two rollers on a downstream side of the nip.

4. The polymer spray deposition system of claim 1, wherein the spray generator is a first spray generator that generates a plurality of first fluid droplets by stretching the fluid between the two diverging surfaces into a first fluid filament until the first fluid filaments breaks into the plurality of first droplets and further comprising a second spray generator that receives the fluid from the fluid source and generates a plurality of second fluid droplets by stretching the fluid between the two diverging surfaces into a second fluid filament until the second fluid filament breaks into the plurality of second fluid droplets, the plurality of first fluid droplets and the plurality of second fluid droplets forming the spray.

5. The polymer spray deposition system of claim 1, wherein the fluid is a thermoplastic having a melting point, and wherein the harvesting element maintains the thermoplastic in the carrier gas flow at a temperature above the melting point.

6. The polymer spray deposition system of claim 1, wherein the harvesting element includes a droplet size selector that selects a predetermined size of droplets from the spray that is in the carrier gas flow.

7. The polymer spray deposition system of claim 1, wherein the harvesting element includes a layer of air that radially surrounds the carrier gas flow and a heating element that radially surrounds the air layer.

8. The polymer spray deposition system of claim 7, wherein the harvesting element further comprises insulation that radially surrounds the heating element.

9. The polymer spray deposition system of claim 1, wherein the multi-nozzle array includes a plurality of nozzles, and further comprising a sheath gas source that emits a sheath gas to circulate around the nozzles in a direction perpendicular to the nozzles.

10. The polymer spray deposition system of claim 1, wherein the multi-nozzle array includes a continuous inkjet gating mechanism that directs the carrier gas flow toward the target surface.

11. The polymer spray deposition system of claim 1, wherein the object production stage is enclosed in a temperature-controlled housing that maintains the carrier gas flow above a freezing temperature of the spray and the stage below a glass transition temperature of the three-dimensional object.

12. The polymer spray deposition system of claim 1, wherein the object production stage translates with respect to the multi-nozzle array in a direction perpendicular to the target surface to form the three-dimensional object.

13. A polymer spray deposition system, comprising:
a spray generator that receives fluid from a fluid source and generates a plurality of fluid droplets, the fluid droplets generated by stretching the fluid between two, diverging roller surfaces unt the stretched fluid exceeds a capillary break-up point of the fluid and breaks into the plurality of fluid droplets;

a carrier gas flow to transport the fluid droplets;

a transport channel that receives the plurality of fluid droplets from the spray generator and entrains the plurality of fluid droplets into the carrier gas flow, the transport channel having:

a tube within which the carrier gas flow travels;

an air stream radially surrounding the carrier gas flow within the tube; and a heating element radially surrounding and external to the tube;

a multi-nozzle array having a plurality of nozzles each having an orifice, the multi-nozzle array receiving the carrier gas flow from the transport channel and pneumatically directing the carrier gas flow through the orifices of the nozzles in a direction perpendicular to the carrier gas flow; and an object production stage that controls the position of the multi-nozzle array with respect to a target surface to which the carrier gas flow is directed through the nozzles.

14. The polymer spray deposition system of claim 13, wherein the fluid is a solution of high molecular weight polymeric fluid.

* * * * *